US006810925B2

(12) United States Patent
Graham et al.

(10) Patent No.: US 6,810,925 B2
(45) Date of Patent: Nov. 2, 2004

(54) HYDROGEN FUELING STATION

(75) Inventors: John David Trevor Graham, Vancouver (CA); Alan John Mulvenna, North Vancouver (CA); William Edward Mufford, Langley (CA); Joachim George Borck, Cloverdale (CA); James Ko, Vancouver (CA); Matthew Albert MacLennan Harper, Vancouver (CA)

(73) Assignee: General Hydrogen Corporation, Seattle, WA (US)

( * ) Notice: Subject to any disclaimer, the term of this patent is extended or adjusted under 35 U.S.C. 154(b) by 25 days.

(21) Appl. No.: 10/340,879

(22) Filed: Jan. 10, 2003

(65) Prior Publication Data

US 2003/0164202 A1 Sep. 4, 2003

Related U.S. Application Data

(60) Provisional application No. 60/347,324, filed on Jan. 10, 2002.

(51) Int. Cl.[7] ............................................. B65B 3/04
(52) U.S. Cl. ................................... 141/98; 141/18
(58) Field of Search ...................................... 141/18, 98

(56) References Cited

U.S. PATENT DOCUMENTS

| | | | |
|---|---|---|---|
| 4,002,553 A | 1/1977 | Arntz | 204/278 |
| 4,995,235 A | 2/1991 | Halene | 62/46.2 |
| 5,029,622 A | 7/1991 | Mutter | 141/4 |
| 5,134,541 A | 7/1992 | Frouin | 361/334 |
| 5,771,946 A | 6/1998 | Kooy et al. | 141/82 |
| 5,962,155 A * | 10/1999 | Kuranaka et al. | 429/20 |
| 6,182,717 B1 | 2/2001 | Yamashita | 141/82 |
| 6,432,283 B1 | 8/2002 | Fairlie et al. | 204/230.2 |
| 6,598,624 B2 * | 7/2003 | Togasawa et al. | 141/1 |
| 2002/0053365 A1 * | 5/2002 | Mutter | 141/4 |
| 2002/0092562 A1 * | 7/2002 | Kami et al. | 137/312 |
| 2003/0168844 A1 * | 9/2003 | Borroni-Bird et al. | 280/784 |

FOREIGN PATENT DOCUMENTS

| | | | |
|---|---|---|---|
| CA | 2271448 | 11/2000 | F17D/1/04 |
| WO | WO00/69773 | 11/2000 | C01B/3/00 |

* cited by examiner

*Primary Examiner*—J. Casimer Jacyna
(74) *Attorney, Agent, or Firm*—Dorsey & Whitney LLP

(57) ABSTRACT

A hydrogen fueling station and system for hydrogen fueled vehicles that can transfer any gaseous fuel to any vehicle and can be located in any place where a vehicle can park and where environmental, safety and other regulatory requirements permit gaseous fuel to be transferred. The hydrogen fueling station is vertically elongate and includes an enclosure that has a plurality of housings to house groups of like components. The housings are configured and positively ventilated with external air to prevent the accumulation of leaked hydrogen.

33 Claims, 7 Drawing Sheets

HYDROGEN FUELING STATION

RELATED APPLICATIONS

This application claims priority from and incorporates by reference U.S. provisional application No. 60/347,324 "Micro-Scaled Hydrogen Fueling Station" to Graham et al., filed on Jan. 10, 2002.

FIELD OF THE INVENTION

The present invention relates generally to fuel transfer systems, and more particularly to a hydrogen fueling station for vehicles.

BACKGROUND OF THE INVENTION

Internal combustion engines are the power source for almost all motorized wheeled vehicles today. Due to the finite supply of fossil fuels and the adverse environmental effects associated with burning these fuels, vehicles are now being developed that are powered by alternative "environmentally friendly" fuels like hydrogen. Such vehicles may be powered by fuel cells, which produce electric power by electrochemically reacting hydrogen fuel with an oxidant such as air. Other hydrogen-powered vehicles include those that combust hydrogen. Supplying hydrogen, especially gaseous hydrogen, to fuel cell vehicles (FCV) and other hydrogen-powered vehicles, presents certain challenges not encountered when fueling vehicles with conventional liquid petroleum-based fuels like gasoline.

Given that the hydrogen-powered vehicle industry is still in its infancy, there is no known hydrogen fueling infrastructure that has been developed to widely supply hydrogen fuel to FCVs and other hydrogen-powered vehicles. In the absence of such an infrastructure, the first FCVs have been built with on-board reformers, which are devices that extract hydrogen from hydrogen-containing fuels such as alcohols or specially-formulated petroleum. While reformers allow FCVs to be fueled with fuels that are relatively conventional compared to pure hydrogen, they present disadvantages. In particular, reformers are relatively complex, bulky and add weight to the vehicle. Furthermore, a by-product of the reforming process is carbon dioxide, which is widely considered to be a major contributor to global warming.

Therefore, efforts have been made to develop hydrogen fueling stations that supply pure hydrogen directly to a vehicle, thereby removing the need for the vehicle to have an on-board reformer. Experimental hydrogen fueling stations have been built as proof-of-concept demonstrations. Ideas proposed for such fueling stations include installing a reformer in the station to enable the station to receive readily-transportable alcohol or specially formulated petroleum fuels, which are then converted by the reformer into hydrogen, and stored in hydrogen storage tanks for later delivery to the vehicle. Other proposals include fueling stations with electrolyzers that convert supply water into hydrogen fuel and oxygen byproduct.

Experimental hydrogen fueling stations that have been built so far have been complex and must be operated under careful supervision. Even as fueling station technology becomes more refined, unique considerations must be given to their operation that do not exist for conventional petroleum-based fueling stations. For example, special considerations must be given to safely handle and store hydrogen and to house complex equipment like reformers, electrolyzers or high-pressure hydrogen storage tanks in a way that is safe to, and away from the public.

In order for FCVs and other hydrogen-powered vehicles to gain mass acceptance, it is desirable to provide a fueling infrastructure with hydrogen fueling stations that are readily accessible by the FCV-driving public, and in particular, that comply with regulations for safely handling and storing hydrogen in publicly accessible areas.

SUMMARY OF THE INVENTION

According to one aspect of the invention, there is provided a hydrogen fueling station comprising: an enclosure having an external air inlet and a ventilation air outlet; a plurality of hydrogen storage tanks located within the enclosure; process components located within the enclosure and in fluid communication with the tanks, for supplying and dispensing pressurized hydrogen gas to and from the tanks; an electrical component housing located within the enclosure, and comprising a pressurization air inlet; a controller housed within the electrical component housing and communicative with the process components, for controlling the supplying and dispensing of hydrogen gas to and from the tanks; and a ventilation assembly. The ventilation assembly comprises: a ventilation air flow path extending from the external air inlet to the ventilation air outlet, the tanks and process components being located within the ventilation air flow path; and a fan located in the air flow path near the external air inlet and upstream of the tanks and process components, and operable to direct air through the air flow path at a rate that maintains the leaked hydrogen concentration in the air flow path below a selected threshold, and to direct air through the pressurization air inlet such that an above-ambient air pressure is maintained inside the electrical component housing.

The enclosure may be substantially vertically elongate. The external air inlet may be located near the base of the enclosure, and the ventilation air outlet may be located at the top of the enclosure. Also, the tanks may be elongated and positioned on end inside the enclosure.

The fueling station may further comprise a tank housing mounted within the enclosure and housing the tanks; the tank housing may comprise a ventilation inlet and outlet in fluid communication with the ventilation air flow path.

The process components may be located substantially beneath the tanks, and may include pneumatic valves and a pneumatic compressor that is pneumatically connected to the pneumatic valves. The pneumatic valves and compressor are both located in the air flow path. The pneumatic valves are in electrical communication with the controller and in hydrogen communication with the tanks. The process components may also include an electrolyzer; the electrolyzer is in electrical communication with the controller and has a hydrogen product outlet in hydrogen communication with the tanks, an oxygen product outlet, and a water supply inlet communicable with a water supply. The oxygen product outlet may be in air communication with the air flow path. The process components may also include a charge port capable of coupling to a hydrogen supply source, supply piping in hydrogen communication with the charge port and at least one tank, and a hydrogen charge compressor in electrical communication with the controller and in hydrogen communication with the supply piping upstream of the tank and downstream of the charge port. The process components may also include a cascade compressor in electrical communication with the controller, and cascade piping in hydrogen communication with the cascade compressor and the tanks.

The fueling station may further comprise a process component housing located within the enclosure below the tanks, and housing the process components. The process component housing comprises a ventilation air inlet and outlet in fluid communication with the ventilation flow path.

The electrical component housing may be located beneath the tanks and further comprises an air outlet. The ventilation assembly may further comprise an exhaust duct extending from the electrical component housing air outlet to the enclosure ventilation air outlet.

According to another embodiment of the invention, the fueling station described above may have electrical components that are located within the enclosure in the air flow path, instead in a pressurized electrical component housing.

According to another aspect of the invention, there is provided a hydrogen fueling station having a small footprint, and comprising: a substantially vertically elongate enclosure; a plurality of elongate hydrogen storage tanks located on end within the enclosure; process components located within the enclosure substantially beneath the tanks and in hydrogen communication with the tanks, for supplying and dispensing pressurized hydrogen gas to and from the tanks; and electrical components located within the enclosure substantially beneath the tanks and including a controller communicative with the process components, for controlling the supplying and dispensing of hydrogen gas to and from the tanks.

DETAILED DESCRIPTION OF EMBODIMENTS OF THE INVENTION

Figure 1:
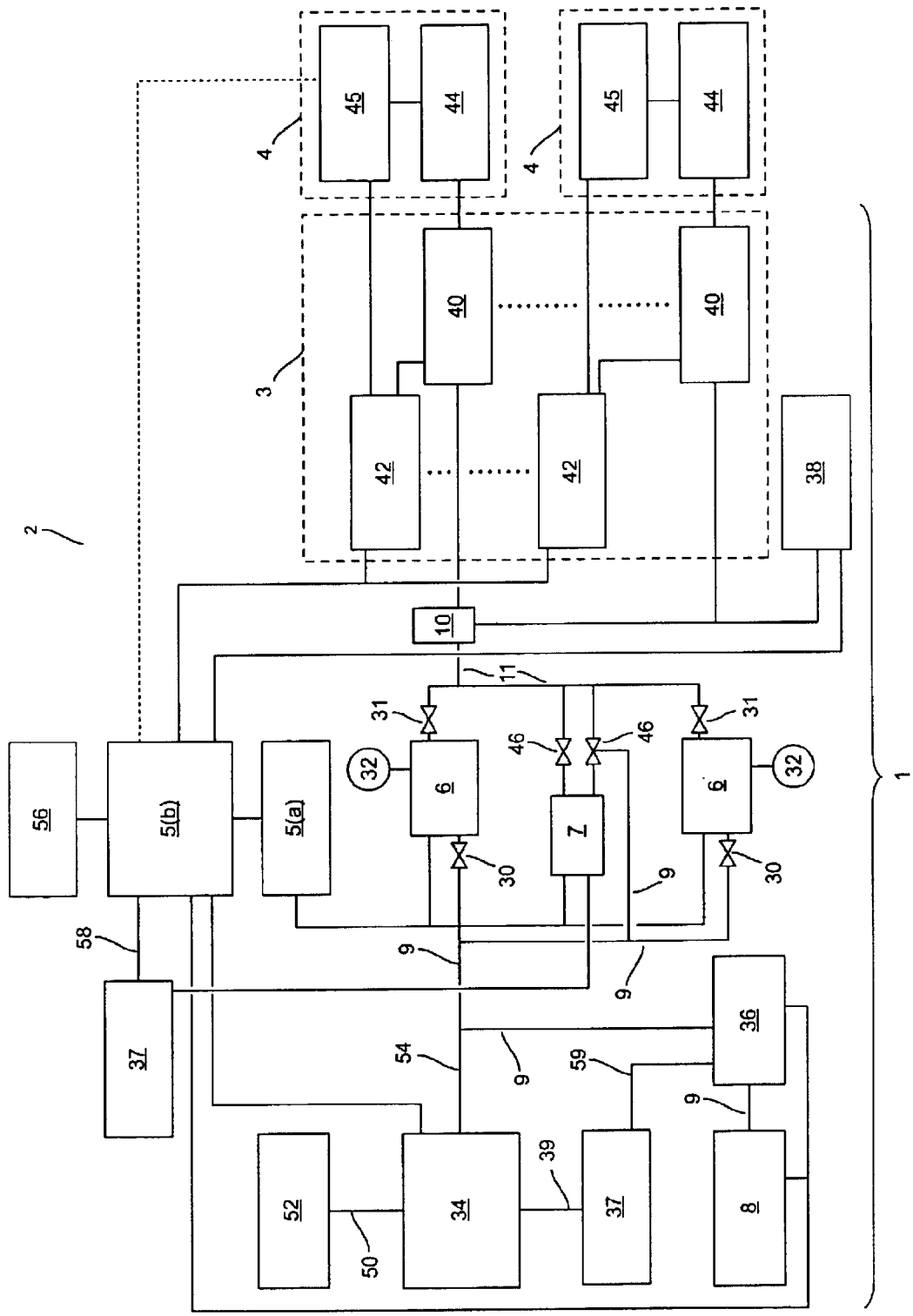
FIG. 1 is a block diagram illustrating the components of one embodiment of a hydrogen fueling station.

Referring to FIG. 1, a hydrogen fueling station system 1 for motor vehicles 4 includes a hydrogen fueling station 2 and a fuel dispensing assembly 3. The station 2 receives, stores and dispenses gaseous hydrogen. The fuel dispensing assembly 3 includes one or more service ports 40 that are in hydrogen communication with the station 2. Each service port 40 is configured to couple to a corresponding connectivity device 44 of a vehicle 4 docked at the service port 40 such that a hydrogen connection is established, and the fuel dispensing assembly 3 is configured to control the transfer of hydrogen from the station 2 to the vehicle(s) 4.

The station 2 comprises a number of components that cooperate to receive, store and dispense hydrogen. FIG. 1 shows the components for a station configuration. These components include a plurality of interconnected fuel tanks 6, a cascade compressor 7 coupled to the tanks 6 to pressurize hydrogen transferred between tanks 6 and to pressurize hydrogen dispensed from the station 2, and a controller 5 communicative with the cascade compressor 7, supply and dispense valves 30, 31, cascade control valves 46, sensors 32 associated with each tank 6, and hydrogen concentration sensors (not shown).

A charge port 8 is coupled to supply piping 9, which in turn is coupled to the tanks 6, to enable an external hydrogen supply source such as a tanker truck (not shown) to couple to the charge port 8 and supply hydrogen to the tanks 6.

A dispense port 10 is coupled to dispense piping 11 which in turn is coupled to the tanks 6. The service port 40 of the fuel dispensing assembly 3 is coupled to the dispense port 10 and may have a service port controller 42 that is communicative with the controller 5 via a signal conduit 12. The controller 5 is also communicative with a vehicle controller 45 of the vehicle 4 docked at the service port 40; the communication may be wireless as shown by dotted line 13 in FIG. 1, or wired (not shown). Flow control valves (not shown) may be located at each of the charge port 8 and dispense port 10 that are communicative with the controller 5. In the case of the charge port 8, the controller 5 may be configured to open the charge port control valve (not shown) when a tanker truck (not shown) has successfully coupled with the charge port 8 and is ready to supply hydrogen. In the case of the dispense port 10, the dispense port flow control valve (not shown) may be biased open during normal operation, and the controller 5 may be programmed to shut the dispense port control valve in the event of an emergency.

Alternatively, the charge port 8 may be coupled to a hydrogen conduit (not shown), which in turn is coupled to an off-station hydrogen source, such as a hydrogen pipeline, or an electrolyzer system connected to a suitable water supply, or a natural gas reformer system connected to a suitable natural gas supply (all not shown).

The station configuration shown in FIGS. 1 and 3 to 7 further includes an on-site hydrogen generator 34, a charge compressor 36 to increase the pressure of supplied hydrogen to the tanks 6, and a manual fuel dispenser 38 coupled to the dispense port 10. The fuel dispensing assembly 3 in this embodiment has multiple service ports 40 and service port controllers 42 for coupling to multiple hydrogen-powered vehicles 4.

Figure 3A:
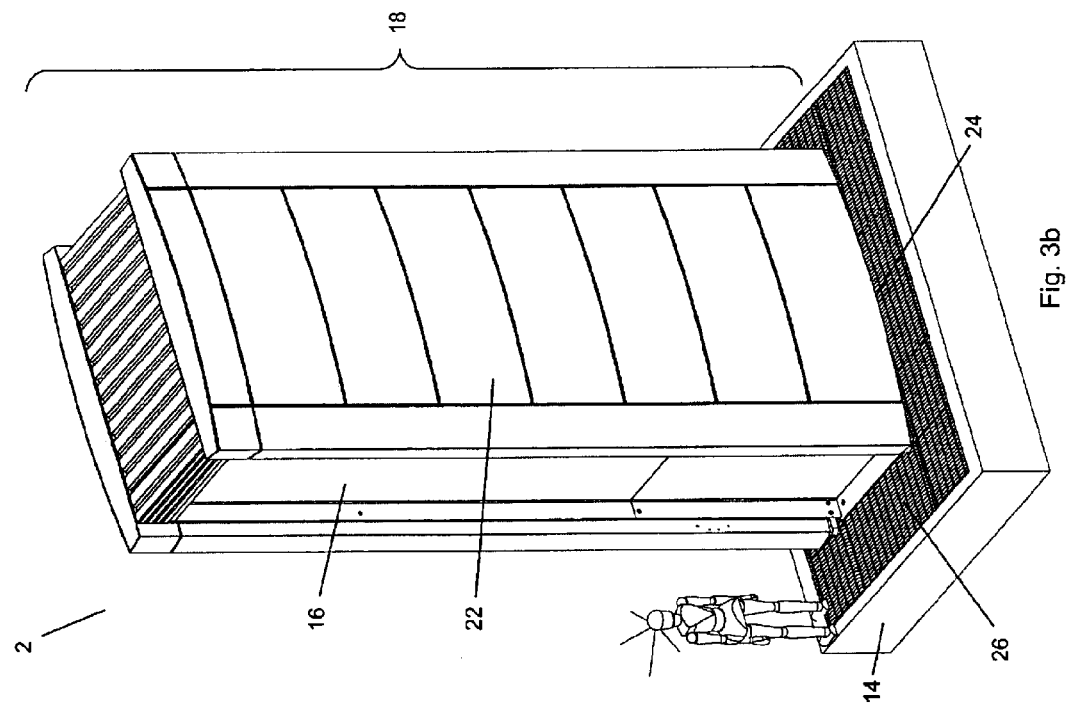
FIGS. 3(a) and (b) are respective front and rear perspective views of a hydrogen fueling station according to one embodiment of the invention.
Figure 3B:
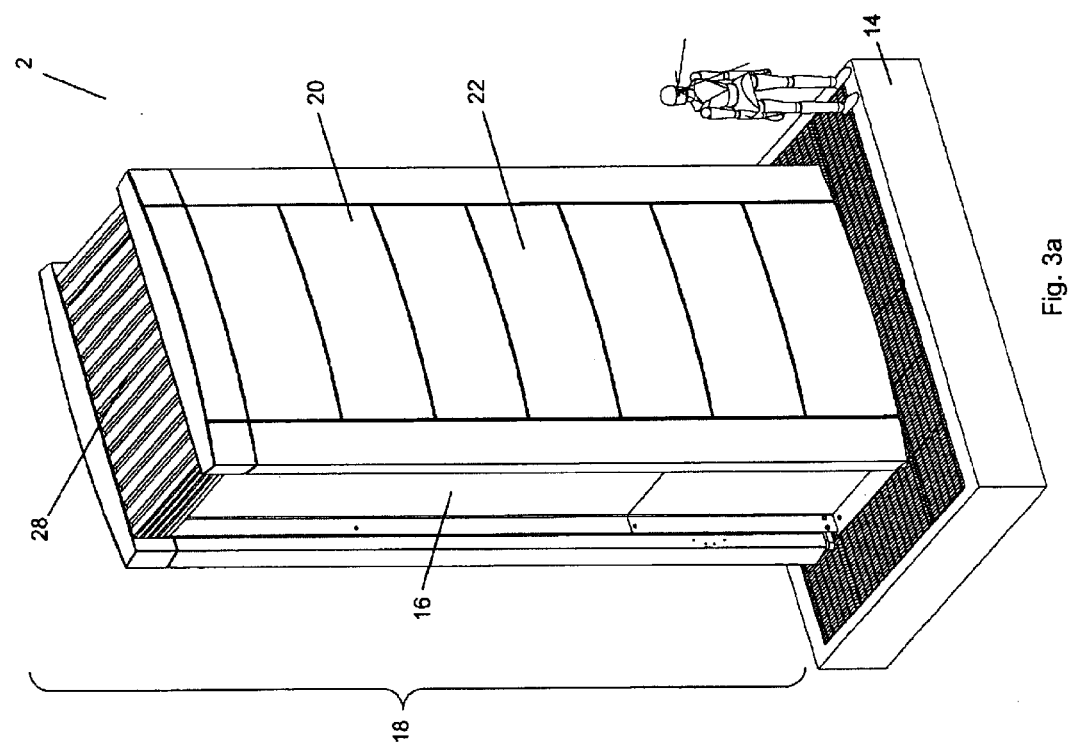

Referring particularly to FIGS. 3(a) and (b), the station 2 is intended to be operable in dense urban locations such as a city parking lot, and as such is designed to have a base 14 with a relatively small "footprint". To achieve such a small footprint, the station 2 has a vertically elongate frame 16 extending from the base 14 that supports interior components of the station 2. Furthermore, the station 2 is intended to be operable in relatively close proximity to vehicles 4 and people, and as such is designed with a protective enclosure 18 that is mounted to the frame 16 and surrounds and substantially encloses the interior components, thereby reducing hazards associated with fires and explosions caused by hydrogen gas leaks.

The enclosure includes panels 20 and access doors 22 that together cover the sides of the station 2. An external air inlet 24 is provided at the intersection of the base 14 and the frame 16, and a ventilation air outlet 28 is provided at the top of the station 2; as will be described below, an air flow path inside the station 2 extends from the air inlet 24 to the ventilation air outlet 28 to discharge leaked hydrogen away from the station 2 at a rate that maintains the leaked hydrogen concentration inside the station 2 below a selected percentage of the lower flammability limit (LFL) of hydrogen, which is 4% hydrogen in air. The air inlet 24 is protected by a grate 26 that covers the base 14 around the enclosure 18.

The base 14 extends into the ground. Optionally, to minimize vibration of sensitive gas handling components, the base 14 can be either pre-fabricated and placed on existing sound bearing material (not shown) or fabricated on-site on sound bearing material (not shown), or include grounding elements 112 (shown in FIG. 7). The frame 16 may be constructed all or in part of steel, as is well known in the art, or all in part of carbon fiber construction to provide a lightweight structure.

Figure 2:
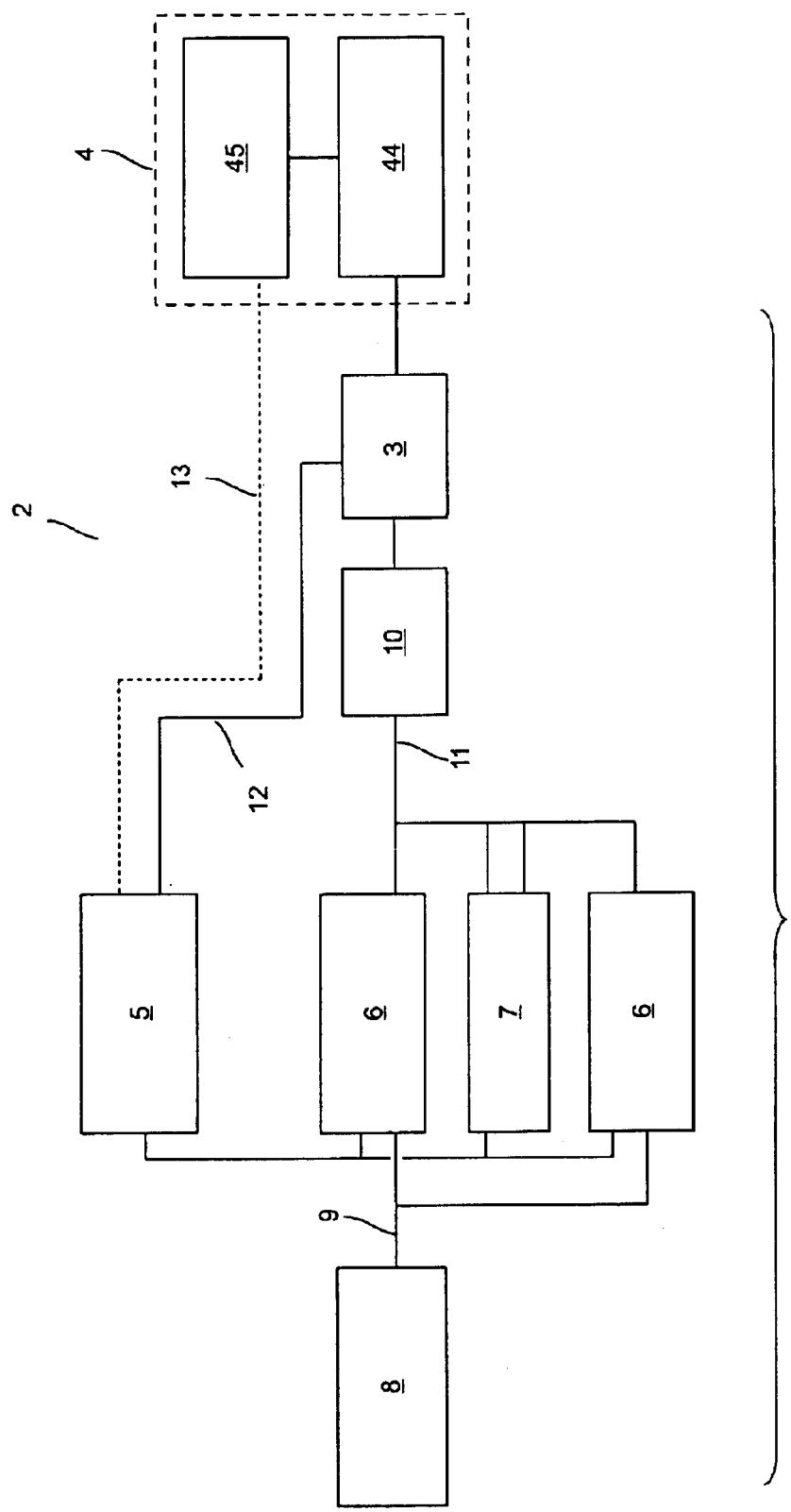
FIG. 2 is a block diagram illustrating the components of another embodiment of a hydrogen fueling station.
Figure 4B:
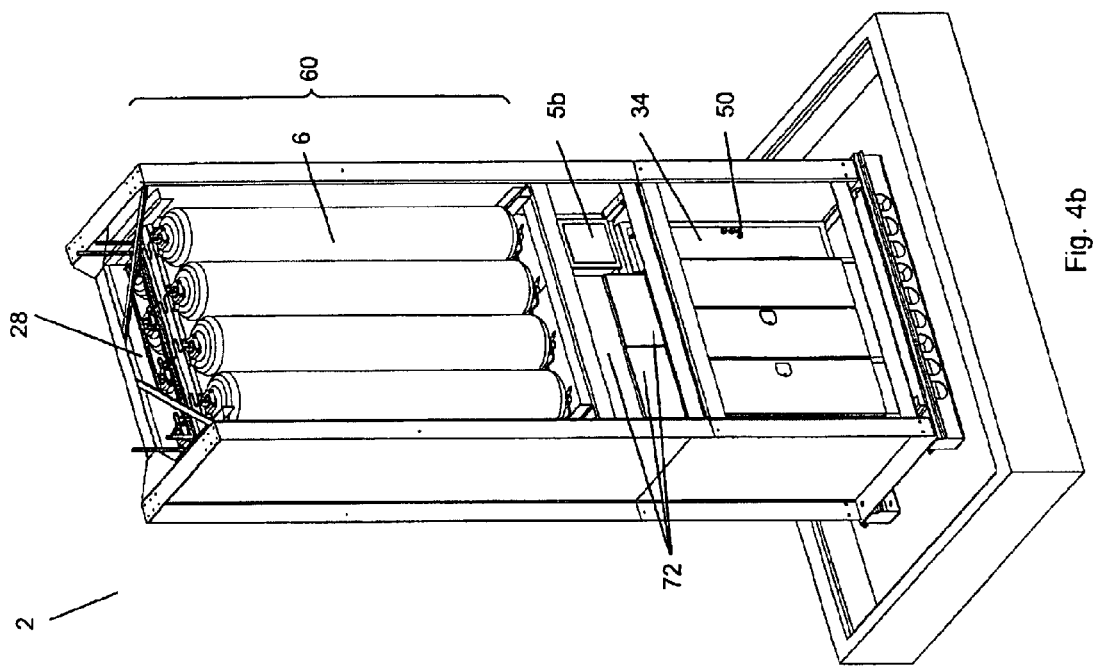
FIGS. 4(a) and (b) are respective front and rear perspective views of the hydrogen fueling station of FIGS. 3(a) and (b), with the enclosure removed to reveal the interior components of the fueling station.
Figure 4A:
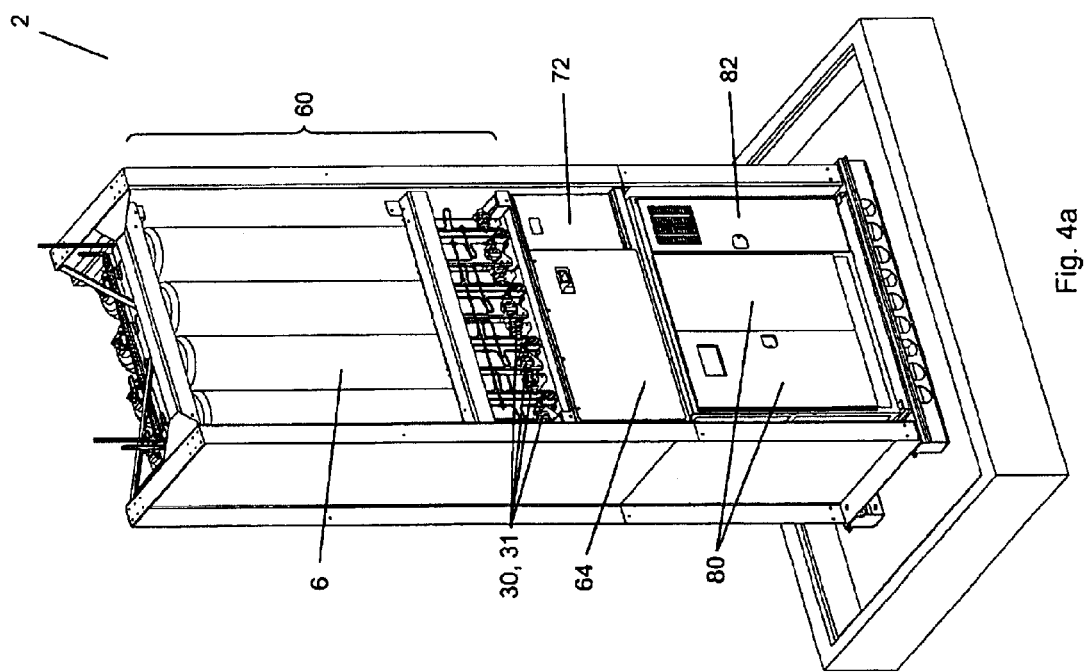

Referring now to FIGS. 2 and 4(a) and (b), the interior components of the station 2 include eight hydrogen storage tanks 6 (only two of which are shown in FIG. 2 for clarity purposes); these tanks 6 may suitably be Type 3 tanks manufactured by Dynetek Industries Ltd; such tanks are rated to store gaseous hydrogen at 5075 psig at 15 degrees C. Other tanks having similar operating parameters may also be used within the scope of this invention. The tanks 6 have a generally elongate cylindrical form and are mounted on end within the frame 16 immediately beneath the ventilation air outlet 28. The tanks 6 may have various forms and be mounted within the frame 16 in other manners as long as they fit within the confines of the enclosure 18.

The tanks 6 have openings at their bottom ends that are coupled to supply and dispense control valves 30, 31. The supply control valves 30 are connected to the supply piping 9, which in turn is coupled to the charge port 8. The optional charge compressor 36 is coupled to the supply piping 9 and is operable to increase the pressure of the supplied hydrogen. The charge compressor 36 may be any suitable known gas compressor. The charge compressor 36 is powered by an external power source 37, via a power line 59.

The dispense control valves 31 are connected to the dispense piping 11 that in turn is connected to the dispense port 10. The fuel dispensing assembly 3 is coupled to the dispense port 10 and comprises multiple service ports 40 that are designed to automatically couple to the connectivity device 44 of the vehicle 4 and effect hydrogen transfer. The dispense port 10 is also coupled to the manual fuel dispenser 38 located on the station 2.

The supply and dispense valves 30, 31 are coupled to piping 9, 11 that is in turn coupled to cascade control valves 46, such that each tank 6 is in hydrogen communication with the other tanks 6, and in hydrogen communication with the cascade compressor 7. The valves 30, 31, 46 may be of the pneumatic or hydraulic type as known in the art. The valves 30, 31, 46 may also be of the solenoid-type if rendered explosion-proof as known in the art. A single control valve of a 3-way construction may be used instead of a supply and a dispense valve 30, 31 to provide the function of each pair of supply and dispense valves, as is known in the art.

The sensors 32 include a pressure transducer and a temperature transducer at each tank 6; a flow meter, pressure regulator, and pressure transducer (all not shown) all coupled to the dispense piping 11; and a pressure transducer (not shown) coupled to the supply piping 9.

The upper end of each tank 6 is fitted with a pressure relief device 51, whose outlets are piped to one or more pressure relief device vent 53, and are operable to release gas from the tanks 6 in the event of overtemperature or overpressure conditions as is known in the art. The pressure relief device vent or vents terminate outside of the enclosure 18 and are equipped with blow-away caps (not shown), as is well known in the art as in known in the art.

Supply hydrogen is provided to the tanks 6 from an external supply source (not shown) coupled to the charge port 8, or from the on-board hydrogen generator 34. In this embodiment, the hydrogen generator is an electrolyzer 34 that dissociates water into its constituent hydrogen and oxygen elements by electrolysis. The electrolyzer 34 has a water supply conduit 50 that is connectable to an external water supply source 52, and a hydrogen product conduit 54 that is coupled to the tanks 6 via the supply piping 9. The cascade compressor 7 may be operated to increase the pressure of the generated hydrogen to useful dispensing pressures. The electrolyzer 34 also has an oxygen product conduit (not shown), that discharges oxygen generated during electrolysis. The electrolyzer 34 is powered by the external power source 37 via power line 39. The electrolyzer 34 may be of the type manufactured by Vandenborre Hydrogen Systems, Model IMET 10, which is capable of producing one kilogram of hydrogen per hour at an outlet pressure of 300 psig, or any other known electrolyzer having comparable operating characteristics.

Alternatively, the hydrogen generator 34 may be a reformer (not shown) that converts a supply feedstock such as natural gas or methanol into hydrogen reformate.

The controller 5 may be a single controller that controls all the operations of the station 2. Such a controller is shown in FIG. 1. Alternatively, multiple controllers 5(a) and 5(b) may be provided to control different aspects of the station operation; this embodiment is shown in FIG. 2. In a multiple controller embodiment, a storage controller 5(a) is programmed to control the transfer of hydrogen between storage tanks 6, and a system controller 5(b) is programmed to control the operation of the charge port 8 and electrolyzer 34 to supply hydrogen to the tanks 6, the operation of the manual fuel dispenser 38, and communication between the station 2 and the service port controller 42 and an external network connection 56.

The storage controller 5(a) is communicative with the supply valves 30, dispense valves 31, sensors 32, cascade control valves 46, and the cascade compressor 7. The storage controller 5(a) is programmed to operate the cascade compressor 7 to increase the pressure of hydrogen being transferred from one or more tanks 6 to one or more other tanks 6 such that the hydrogen in at least one of the tanks 6 is at a pressure that is suitable for dispensing hydrogen to the vehicle 4 at a fast rate, i.e. to provide a "fast fill" to the vehicle 4. A suitable cascade compressor is manufactured by Hydro-Pac Inc., whose Model C06-06-300 LX-V hydraulic compressor is operational for inlet pressures ranging from 300 to 6000 psig and has a maximum discharge pressure of 6000 psig and can compress up to 11 Liters of hydrogen per minute, however, other suitable hydraulic, pneumatic or electric compressors with similar operating parameters may be used.

The storage controller 5(a) is also programmed with a pressure optimizing algorithm that is executed to periodically transfer hydrogen between at least two tanks 6 for the purpose of optimizing the hydrogen available at high pressure. The pressure optimizing algorithm is a method that moves and compresses gas from a first group of tanks 6 to a second group of tanks 6 in order to maximize the pressure in at least one tank 6 of the second group for the purpose of providing the highest available pressure gas to the service port(s) 40 at all times. To carry out this method, the storage controller 5(a) monitors the pressure or mass flow of each tank 6 via the sensors 32, and based on the sensor readings, activates the cascade compressor 7 to compress and transfer hydrogen from one tank 6 to another tank 6.

By controlling the dispense valve 31, the storage controller 5(a) also controls the dispensing of hydrogen from the tanks 6 through the dispense port 10 and to the fuel dispensing assembly 3. Hydrogen is typically dispensed from one tank 6 at a time, as selected by the storage controller 5(a) on the basis of being above a minimum pressure suitable for charging the vehicle 4.

The system controller 5(b) is programmed to oversee status, transactions, and processes of both the tanks 6 and external connections to power, continuous fuel sources and the service port(s) 40. Specifically with respect to controlling the distribution of hydrogen to individual vehicles 4 through a service port 40 or manual fuel dispenser 38, the system controller 5(b) enables, monitors and disables all aspects of the connection between components of the hydrogen fueling station system 1 and the vehicles 4, including system safety controls.

The system controller 5(b) is powered by the external power source 37 via power line 58, and is communicative with the sensors 32, optional charge compressor 36, the optional hydrogen generator 34, and the charge port 8. The system controller 5(b) is also communicative with the manual fuel dispenser 38 and respective service port controllers 42 of the fuel dispensing assembly 3.

Each service port controller 42 controls the operation of an associated service port 40. The system controller 5(b) manages multiple simultaneous transactions and data transfers between the network connection 56 and the external service port controller(s) 42. The system controller 5(b) can manage the modular replacement of components within the hydrogen fueling station system 1, and can be reconfigured for modular replacement of internal hydrogen fueling station components and connection and disconnection of external service ports 40. The system controller 5(b) can also control the operating mode of the hydrogen fueling station system 1 and place the system 1 in a maintenance mode where the modular replacement is plug-and-play, to allow continuous operation.

The manual fuel dispenser 38 is mounted at a user-convenient location on the enclosure 18. When the dispenser 38 is coupled to the vehicle 4 and activated, a signal is sent to the system controller 5(b) requesting dispensing of hydrogen. The system controller 5(b) then executes an approval subroutine, and if the request is approved, sends a control signal to activate the manual fuel dispenser to dispense hydrogen to the coupled vehicle 4. The manual fuel dispenser 38 includes a flexible gas line 127 (shown in FIG. 7) with built-in grounding and optionally a second grounding cable (not shown) that terminates in a fuel dispensing nozzle 125 (shown in FIG. 7) such as an OPW Fueling Components Model CW5000, which is operational at gas pressures of up to 5000 psig and within a temperature range of −40 to 85 degrees Celsius. In both these cases the hydrogen fueling station 2 may optionally include a station dispensing display (not shown) for the connection status and payment for services.

While only one manual fuel dispenser 38 is shown in FIG. 2, it is within the scope of the invention to include multiple manual fuel dispensers, each in hydrogen communication with the dispense port 10 and in electrical communication with the system controller 5(b).

The dispense port 10 may include a control valve (not shown) communicative with the system controller 5(b) via signal conduit (not shown); the dispense port control valve (not shown) may be kept open during normal operation, but may be shut in the event of a station problem.

The network connection 56 may be a cable modem, wireless transponder, Ethernet connection, or other suitable network connection as known in the art. Examples of data transferred over the network connection include recorded music, vehicle security monitoring, financial transactions, and vehicle diagnostic services.

The external power source 37 provides power to operate electronic components in the hydrogen fueling station 2, such as the controllers 5(a), 5(b), as well as process components such as the optional charge compressor 36 and the cascade compressor 7, and to provide power externally to the service port controller(s) 42, the service ports 40, and the optional hydrogen generator 34. Such an external power source may be provided by connecting the power line 58 to a utility power grid. In such case, the power line 58 connects directly to the system controller 5(b), which has standard power conversion components for providing suitable power to other components in the station 2. As is common in the art, multiple direct power connections from the utility power grid are used where needed to power high-power components such as the charge compressor 36.

Alternatively, the station 2 may include an internal power generator (not shown) housed within the enclosure 18 to provide a stand-alone power source for the hydrogen fueling station system 1, or a complementary power source with the utility power grid. In this connection, the internal power generator may by a fuel cell that generates electrical power from hydrogen or another suitable fuel. The inclusion of an internal power generator within the hydrogen fueling station 2 allows a greater degree of portability and ease of installation of the hydrogen fueling station system 1 without requiring connection to the utility power grid. Other suitable generators include a hydrogen internal combustion engine, a photovoltaic cell power generator and other stand-alone combinations such as, but not limited to, battery/fuel cells and battery/photovoltaic cell combinations. Further, both the internal generator and the power grid can be used in combination based on a control decision by the system controller 5(b).

Referring now to FIGS. 5 and 6, the station 2 is physically partitioned into electrical, gas storage, and process zones to reduce the dangers associated with fires and explosions caused by a combination of leaked hydrogen gas and an ignition source. Generally speaking, hydrogen storage and transfer components that may leak hydrogen are located in respective storage and process zones that are ventilated with an air flow sufficient to maintain the hydrogen concentration in the two zones below a selected percentage of the LFL. Electrical components are located in an electrical zone that is maintained at a higher pressure than the storage and process zones to prevent leaked hydrogen from coming within proximity of the electrical components.

Figure 5B:
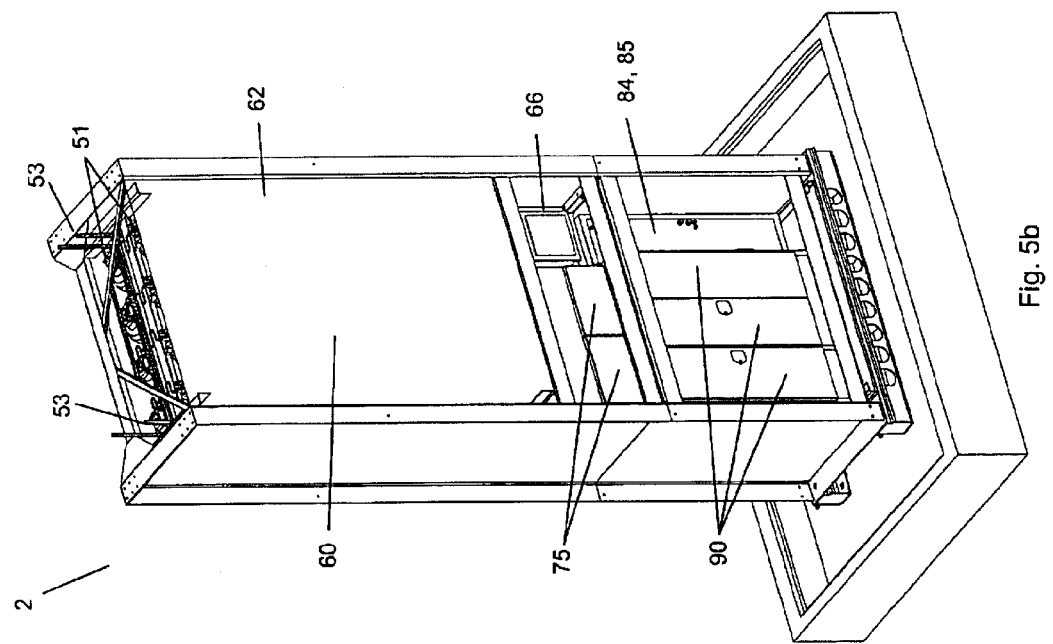
FIGS. 5(a) and (b) are respective front and rear perspective views of component housings and other selected interior components of the hydrogen fueling station of FIGS. 3(a) and (b).
Figure 5A:
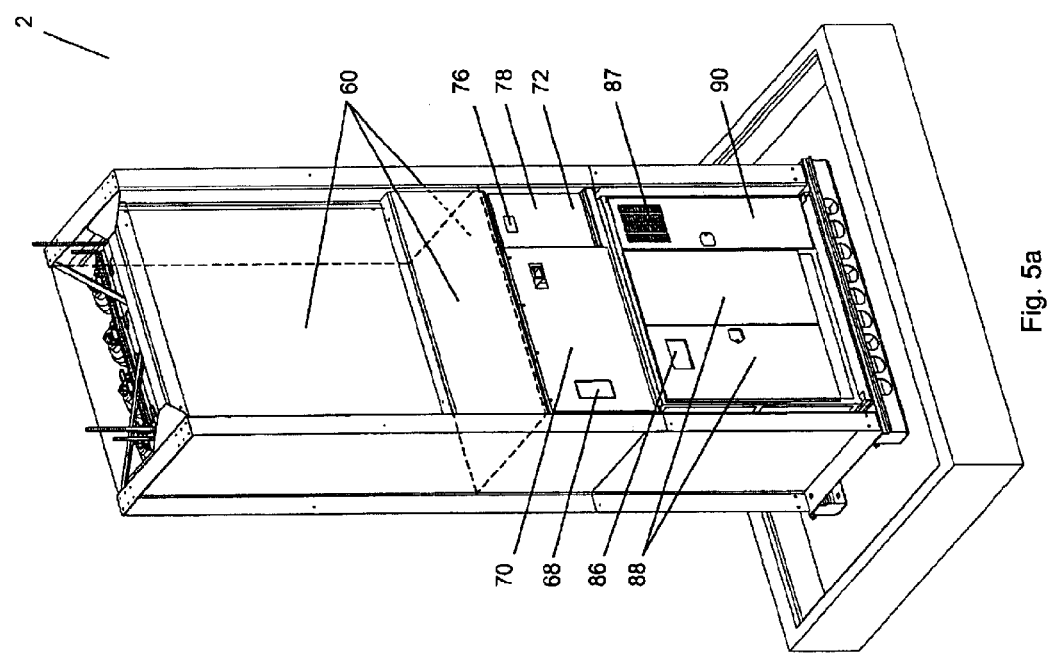

Referring particularly to FIGS. 5(a) and 5(b), the storage tanks 6, the supply, dispense and cascade control valves 30, 31, 46 and most of the piping 9 are located inside a tank housing 60 that serves as a gas separation barrier and explosion shield between the tanks 6 and the rest of the station 2. The tank housing 60 resembles a rectangular prism that is open at the top, and which provides a continuous air flow path between the tanks 6 and the gas storage ventilation air outlet 28. Access panels 62 gives access to the tank housing 60.

Mounted directly underneath the tank housing 60 is a process component housing 64 that houses the cascade compressor 7 and the charge compressor 36. When any of the valves 30, 31, 46 are pneumatically operated, a pneumatic compressor (not shown) is provided and also located within the process component housing 64. A gas buffer bottle (not shown) is provided within this housing 64 and coupled to the hydrogen piping. Openings (not shown) are provided to enable the equipment to couple to respective piping. Also, a ventilation air inlet 66 is provided to the process component housing 64 to allow ventilation air flow into the housing 64. A ventilation air outlet 68 is provided on a process component access door 70 to allow ventilation air flow to exit the housing 64.

Also mounted directly underneath the tank housing 60 and beside the process component housing 64 is an electrical component housing 72 that houses the storage and system controllers 5(a) and 5(b) and a power transformer (not shown) that is coupled to the power lines 39, 58, 59 upstream of the electrically powered components. Openings are provided to enable signal conduits and power lines to pass in and out of the electrical component housing 72. Also, a ventilation air inlet (not shown) are provided through openings to the side of the electrical component access panels 75 to allow pressurization air flow into the housing 72, and a ventilation air outlet 76 is provided in an electrical component housing access door 78 to discharge pressurization air from the housing 72. The outlet 76 is sized smaller than the inlet so that air flowing into the electrical component housing 72 pressurizes the inside of the housing 72.

Mounted directly underneath the process and electrical component housings 64, 72 are the electrolyzer process component housing 80 and the electrolyzer electrical component housing 82. The electrolyzer process component housing 80 houses the process components of the electrolyzer 34, including an electrolyzer, gas handling equipment, and filters (all not shown); the electrolyzer electrical component housing 82 houses the electrical components of the electrolyzer 34, including at least one controller 5, and power electronics (not shown) such as a power transformer and rectifier. Openings are provided in the electrolyzer process component housing 80 to enable the electrolyzer process components to couple to the water supply conduit 50 and to the hydrogen product conduit 54. Openings are provided in the electrolyzer electrical component housing 82 to enable the electrolyzer electrical components to couple to respective power lines and signal conduits. Ventilation air inlets 84, 85 are provided for each of the electrolyzer housings 80, 82 to allow pressurized ventilation air flow into the housings 80, 82. Similarly, ventilation air outlets 86, 87 are provided in access doors 88, 90 of each housing 80, 82 to discharge ventilation air from the housings 80, 82.

Figure 6B:
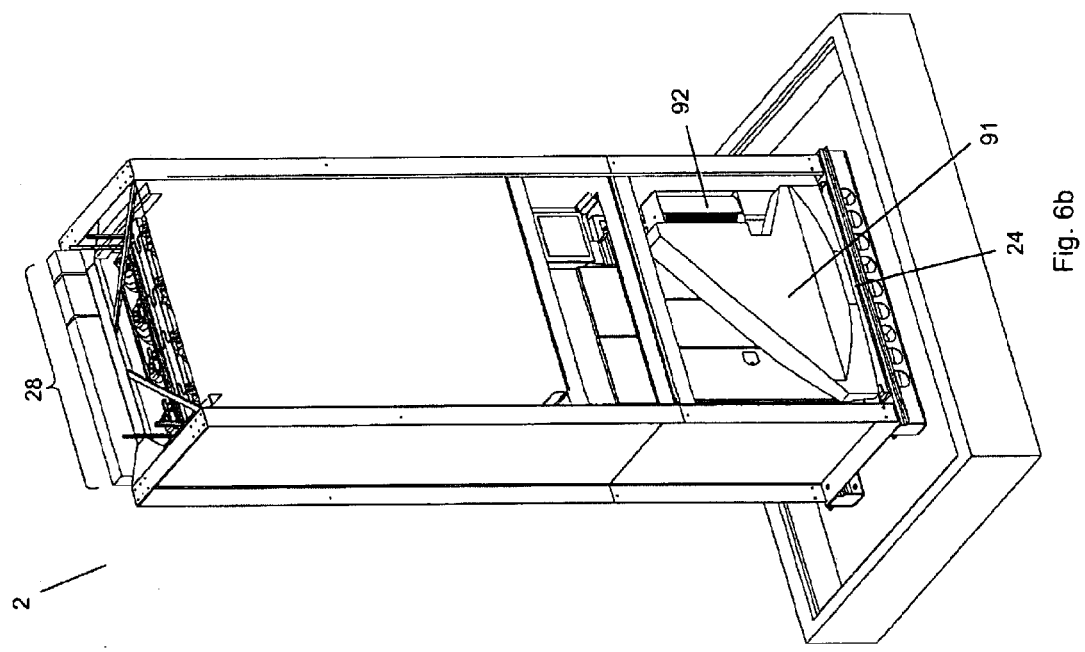
FIGS. 6(a) and (b) are respective front and rear perspective views of ventilation ducting and other selected interior components of the hydrogen fueling station of FIGS. 3(a) and (b).

Referring now to FIG. 6(b), a fan intake plenum 91 is mounted inside the station 2 in a space between an enclosure panel 20 and the electrolyzer housings 80, 82 and has an inlet coupled to the external air inlet 24, and an outlet near the electrolyzer housing air inlets 84, 85. A ventilation fan 92 is mounted at the plenum outlet, is powered by the power source 37 via a power line (not shown) and communicative with the system controller 5(b). The fan 92 is configured to blow ventilation air directly into the electrolyzer housings 80, 82 via their respective air inlets 84, 85 and into the tank housing 60, process component housing 64, and electrical component housing 72 via intake ducting (not shown).

Figure 6A:
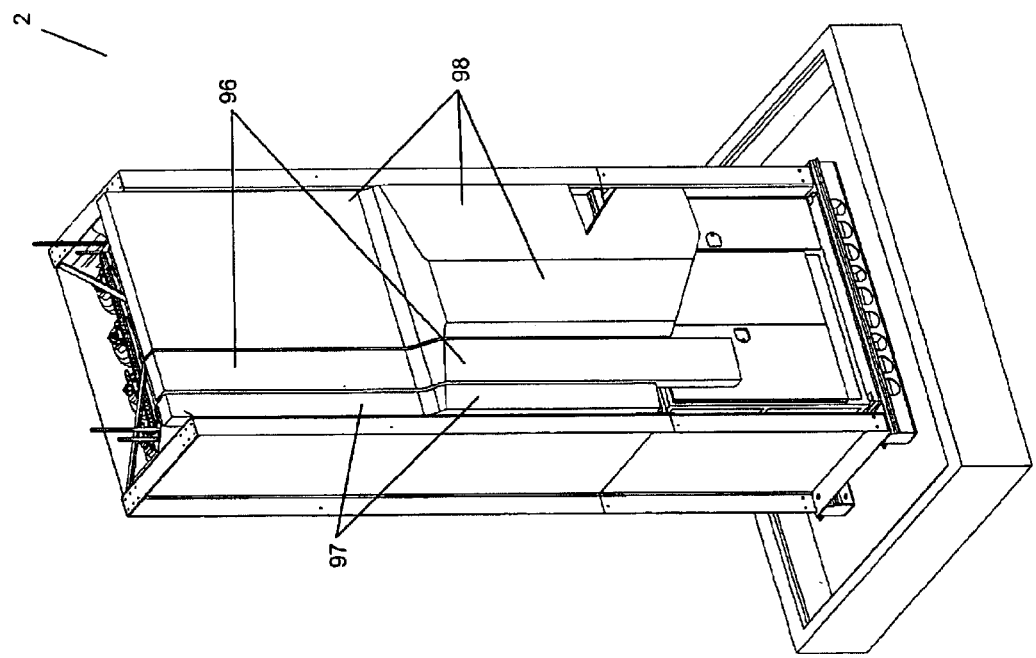

Referring to FIGS. 6(a) and 6(b), discharge ducting is mounted inside the station 2 in a space between an enclosure panel 20 and the tank housing 60, process component housing 64, electrical component housing 72 and electrolyzer housings 80, 82, to provide an air flow path from the housings 64, 72, 80, 82 to the ventilation air outlet 28. In particular, a first discharge duct 96 is coupled to the electrolyzer process component housing air outlet 86 and extends to the ventilation air outlet 28. A second discharge duct 97 is coupled to the ventilation air outlet 68 of the process component housing 64. A third discharge duct 98 is coupled to the air outlets 76, 87 of the electrical component housing 72 and electrolyzer electrical component housing 82 and extends to the ventilation air outlet 28. The tank housing 60 is open at its top, so ventilation air is vented directed to the ventilation air outlet 28 without dedicated ducting.

In operation, the fan 92 sucks air from outside the station 2 through the external air inlet 24 and plenum 91, and blows the air into the respective component housings 60, 64, 72, 80, 82, through these housings, and out of the station 2 via the first, second and third discharge ducts 96, 97, 98. The fan speed is selected to provide a sufficiently high flow rate that maintains the leaked hydrogen concentration inside all the housings other than the electrical component housing 72 below a selected percentage of the LFL, and that maintains the air pressure inside the electrical component housing 72 at a higher level than the other housings 60, 64, 80, 82 of the station 2, so that any leaked hydrogen from those housings 60, 64, 80, 82 cannot enter the electrical component housing. As a result, an air flow path is provided that avoids all components in the station 2 that may leak hydrogen, and carries away any leaked hydrogen at a sufficient rate that the hydrogen concentration within the station 2 is maintained below an acceptable threshold.

In determining the appropriate air flow rate, a count was made of all the threaded hydrogen connections in the station 2, which included fittings associated with the tanks 6, supply piping 9, dispense piping 11, and manual fuel dispenser 38. Then, a theoretical maximum leak rate per fitting was determined, and the maximum desired hydrogen concentration ($C_{H2\ Max}$) was selected. With these values, a maximum theoretical leak rate for the station 2 was determined by multiplying the theoretical leak rate per fitting by the total number of leakable fittings. This value enables the determination of the required air flow to achieve the selected $C_{H2\ Max}$. Table 1 below illustrates the determination of an appropriate air flow rate according to the test run:

TABLE 1

Air Flow Rate Determination

Hydrogen Fueling Station Hydrogen Leak Rates

| | |
|---|---|
| Maximum theoretical leak rate per fitting | 20 scc/min |
| Gaseous Hydrogen LFL, by volume | 4% |
| Maximum desired Hydrogen concentration | 10% of LFL |
| Fittings Summary: Threaded Connections | |
| Cylinders: | |
| high pressure fittings | 8 |
| union to main pressure rails | 4 |
| pressure relief device (prd) fittings | 4 |
| fitting to prd rail | 1 |
| pressure transducer | 1 |
| temperature transducer | 2 |
| GFI end plugs | 2 |
| Total | 22 |
| Multiplied by number of cylinders | 176 |
| Hydrogen flow path from tanks | |
| HV-HF1 | 2 |
| CONN5 | 2 |
| flowmeter FT-HF1 | 4 |

TABLE 1-continued

Air Flow Rate Determination

| | |
|---|---|
| pressure regulator PCV-HF1 | 4 |
| pressure transducer PT-HF10 | 4 |
| 3-way valve AOV-HF17 | 3 |
| PRV-HF18 | 4 |
| PRV-HF17 | 4 |
| vent line tee | 3 |
| Hydrogen flow path to tanks | |
| output from electrolyzer | 1 |
| buffer tank inlet CYL-HF9 | 3 |
| buffer tank outlet CYL-HF9 | 3 |
| check valve CV-HF1 | 2 |
| pressure transducer PT-HF9 | 4 |
| tee to hydrogen return rail | 3 |
| compressor inlet stage 1 | 2 |
| compressor outlet stage 1 | 2 |
| compressor inlet stage 2 | 2 |
| compressor outlet stage 2 | 2 |
| tee to compressor inlet | 3 |
| tee to hydrogen feed rail | 3 |
| buffer tank inlet/outlet CYL1 | 3 |
| air actuated valve HydroPac-1 | 2 |
| air actuated valve HydroPac-2 | 2 |
| Manual fill flow path | |
| inlet | 1 |
| tee to hydrogen feed rail | 3 |
| Total number of threaded Hydrogen connections: | 247 |
| Maximum theoretial Hydrogen leak rate | 4940 scc/min =4.94 liters/min |
| Thus: Required airflow to maintain 10% of the LFL | 1204.9 liters/min =42.5 scfm |
| 2x Safety factor gives: | 85.1 scfm |
| Hydrogen Leak rate of Bottle Pack | 176 connections |
| Theoretical Leak Rate | 3.52 liters/min |
| Thus: Required airflow to maintain 10% of the LEL | 880 liters/min =31.1 scfm |
| 2x Safety factor gives: | 62.2 scfm |

Alternatively, hydrogen concentration sensors (not shown) may be strategically located in the air flow path(s), and communicate with the system controller 5(*b*) to enable real-time feed back of the leaked hydrogen concentration in the station 2. The system controller 5(*b*) may be programmed to operate the fan 92 according to the theoretically determined ventilation flow rate requirements, or to control the fan speed responsive to the hydrogen concentrations measured by the hydrogen concentration sensors.

In an alternative embodiment, the cascade compressor 7 and the charge compressor 36 may be one compressor that is installed to perform the functions of both compressors 7, 36.

Figure 7:
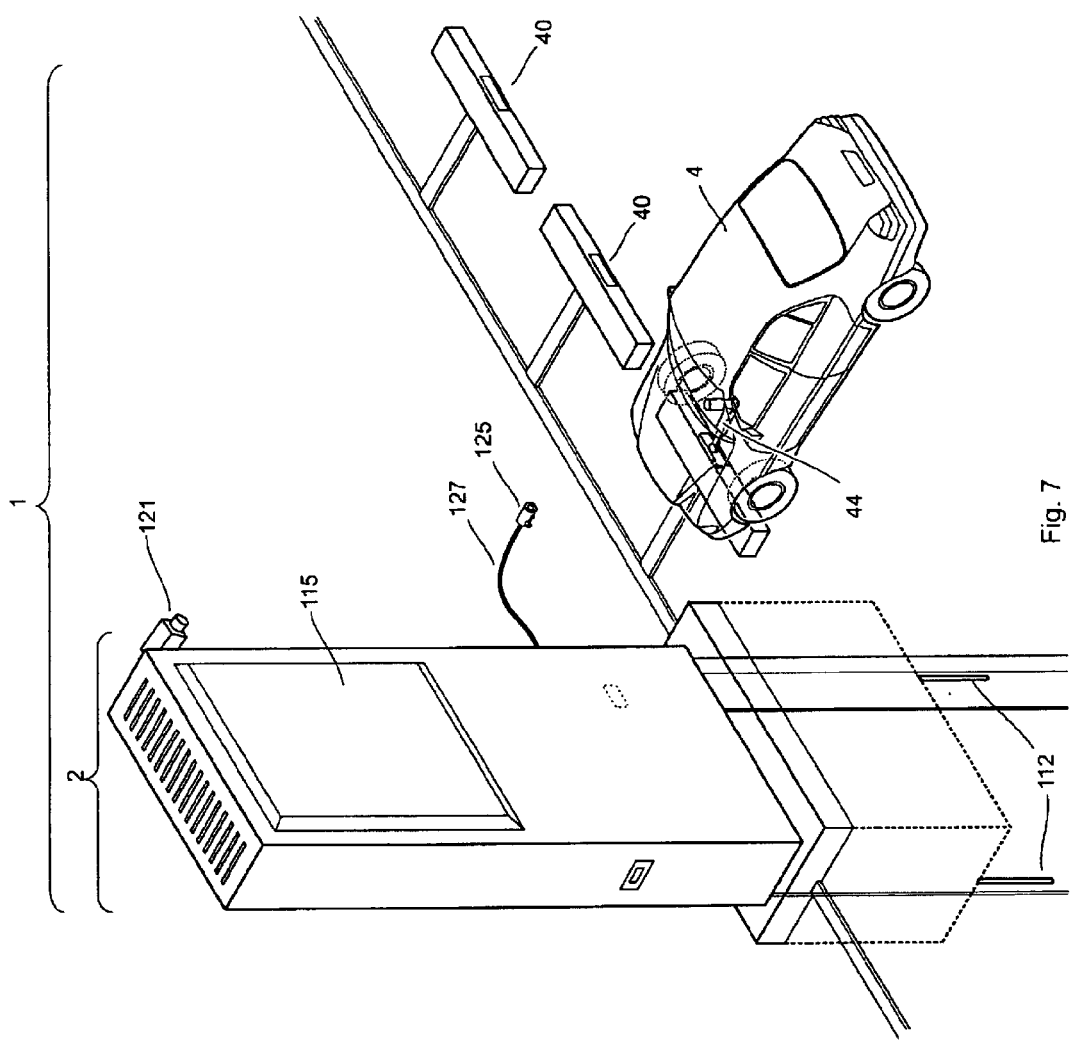
FIG. 7 is a front perspective view of the hydrogen fueling station.

FIG. 7 illustrates a hydrogen fueling station enclosure 18 and optional external features of the hydrogen fueling station 2. Signage 115 for the purpose of advertising is attached on any surface of the enclosure 18, to display advertising or information content of any kind. The examples of signage 115 types include a static visual display, or active computer controlled digital display that is connected to the system controller 5(*b*) and can be remotely updated through the network connection 56. Combinations of signage types are possible. An additional function is to transmit the advertising electronic data directly to a vehicle 4 through the service port 40 or by wireless transmission through electronic communication devices integrated into the hydrogen fueling station 2. The signage 115 may be illuminated or non-illuminated signage including light emitting devices (LED) or video panel display for station identification, product description, advertisement of product price and advertising or communication for other purposes. The advertising data is optionally selected by the system controller 5(*b*) based on identification and profiling of a specific identified vehicle 4 or group of identified vehicles.

An optional video camera 121 is shown attached to the enclosure 18, and electrically connected (not shown) to the system controller 5(*b*). The video camera 121 can be positioned anywhere on the enclosure 18, but preferably near the top for security and wide view. The camera 121 may provide features such as security monitoring of the hydrogen fueling station system 1 and alarm messages and capture data sent to the network through the system controller 5(*b*).

According to an alternative embodiment, the system controller 5(*b*) is configured to communicate with an external network when a hydrogen supply source is coupled to the charge port 8, to send status data to the network and receive filling instructions from the network. The supply source may be a tanker truck that communicates wirelessly with a wireless communications device (not shown) on the station 2 to collect information including identity of the hydrogen fueling station 2 and necessary billing information and required fill quantity. The communications device can be wired or wireless and optionally include short range wireless (e.g. such as the wireless Bluetooth TM protocol) for local communications with vehicle controllers 45 and service port controllers 42. The communication device may also include wireless optical transmitters.

In another alternative embodiment, the service port 40 is replaced by a conventional gas dispenser as is well known in the art.

In another alternative embodiment, the fuel dispensing assembly 3 is replaced by a fuel dispensing receptacle 125 directly connected to the dispense port 10.

In another alternative embodiment, more than one hydrogen fueling station 2 is combined to increase the capacity or functionality of the hydrogen fueling station system 1. In such an embodiment, some components, such as controllers, may not need to be duplicated to preserve the functionality of those components.

Although the embodiments described above relate to the storing and dispensing of hydrogen, the station 2 may be configured to store and dispense other gases such as blends of hydrogen and natural gas.

For the described embodiments, the service port controller 42 may optionally be part of the hydrogen fueling station system controller 5(*b*) instead of being a separate component located in the service port 40.

In another alternative embodiment, two tank valves are combined into one double-ended valve assembly (not shown) by incorporating two valves into one body. This design allows two storage tanks 6 to be joined by way of the double-ended valve assembly, reducing the amount of space required for tank valve assemblies and increasing potential gas storage space.

In another alterative embodiment, the supply and dispense valves 30, 31 can be made smaller by designing the valves 30, 31 to perform only the functions necessary to the charging and fueling operations. In an embodiment of the current invention, control valves (not shown) can be installed at both ends of a storage tank 6 to allow for redundancy of function and to allow for greater flexibility in the transfer of contained gases between storage tanks 6.

In another alternative embodiment, the hydrogen fueling station 2 is configured to store and exchange liquid hydrogen. In this embodiment, the hydrogen fueling station 1 includes a liquid hydrogen container (not shown) to receive and store liquid hydrogen delivered to the hydrogen fueling station 2 by a tanker truck (not shown); a dispensing system (not shown) to deliver liquid hydrogen through a hose (not shown) to the fuel inlet port (not shown) on a vehicle 4; and a distribution system (not shown) with suitable controls to fluidly connect the dispensing system to the liquid hydrogen storage container (not shown), as common in the art of cryogenic liquid gas storage, for the purpose of transferring the stored fuel to the vehicle 4; and a vent (not shown) extending to the top of the enclosure 18 to allow hydrogen gas from liquid hydrogen "boil-off" to be vented safely to the atmosphere. Boil-off refers to the unavoidable vaporization of some liquid hydrogen that occurs in liquid hydrogen storage vessels.

In another alternative embodiment, hydrogen for a hydrogen fuel cell power generator (not shown) or a hydrogen internal combustion engine (not shown) comes all or in part from the "boil-off" of a liquid hydrogen storage tank (not shown), in fluid connection with the internal power generation component (not shown).

While the preferred embodiment of the invention has been illustrated and described, it will be appreciated that various changes can be made therein without departing from the scope and spirit of the invention.

What is claimed is:

1. A hydrogen fueling station comprising:
   an enclosure having an external air inlet and a ventilation air outlet;
   a plurality of hydrogen storage tanks located within the enclosure;
   process components located within the enclosure and in fluid communication with the tanks, for supplying and dispensing pressurized hydrogen gas to and from the tanks;
   an electrical component housing located within the enclosure, and comprising a pressurization air inlet;
   a controller housed within the electrical component housing and communicative with the process components, for controlling the supplying and dispensing of hydrogen gas to and from the tanks; and
   a ventilation assembly comprising
      a ventilation air flow path extending from the external air inlet to the ventilation air outlet, the tanks and process components being located within the ventilation air flow path; and
      a fan located in the air flow path near the external air inlet and upstream of the tanks and process components, and operable to direct air through the air flow path at a rate that maintains the leaked hydrogen concentration in the air flow path below a selected threshold, and to direct air through the pressurization air inlet such that an above-ambient air pressure is maintained inside the electrical component housing.

2. The fueling station of claim 1 wherein the enclosure is substantially vertically elongate.

3. The fueling station of claim 2 wherein the external air inlet is near the base of the enclosure.

4. The fueling station of claim 2 wherein the ventilation air outlet is at the top of the enclosure.

5. The fueling station of claim 4 wherein the tanks are elongated and are positioned on end inside the enclosure.

6. The fueling station of claim 1 further comprising a tank housing mounted within the enclosure and housing the tanks, the tank housing comprising a ventilation inlet and outlet in fluid communication with the ventilation air flow path.

7. The fueling station of claim 1 wherein the process components are located substantially beneath the tanks.

8. The fueling station of claim 1 wherein the process components include pneumatic valves in communication with the controller, coupled to the tanks and located in the ventilation air flow path, and a compressor pneumatically connected to the pneumatic valves.

9. The fueling station of claim 1 wherein the process components include an electrolyzer in electrical communication with the controller and having a hydrogen product outlet in hydrogen communication with the tanks, an oxygen product outlet, and a water supply inlet communicable with a water supply.

10. The fueling station of claim 9 wherein the oxygen product outlet is in air communication with the air flow path.

11. The fueling station of claim 1 wherein the process components include a charge port capable of coupling to a hydrogen supply source, and supply piping in hydrogen communication with the charge port and at least one tank.

12. The fueling station of claim 11 wherein the process components include a hydrogen charge compressor in electrical communication with the controller and in hydrogen communication with the supply piping upstream of the tank and downstream of the charge port.

13. The fueling station of claim 1 wherein the process components include a cascade compressor in electrical communication with the controller and cascade piping in hydrogen communication with the cascade compressor and the tanks.

14. The fueling station of claim 1 further comprising a process component housing located within the enclosure below the tanks, and housing the process components, the process component housing comprising a ventilation air inlet and outlet in fluid communication with the ventilation flow path.

15. The fueling station of claim 1 wherein the electrical component housing is located beneath the tanks and further comprises an air outlet and the ventilation assembly further comprises an exhaust duct extending from the electrical component housing air outlet to the enclosure ventilation air outlet.

16. A hydrogen fueling station comprising:
   (a) an enclosure having an external air inlet and a ventilation air outlet;
   (b) a plurality of hydrogen storage tanks located within the enclosure;
   (c) process components located within the enclosure and in fluid communication with the tanks, for supplying and dispensing pressurized hydrogen gas to and from the tanks;
   (d) electrical components including a controller communicative with the process components, for controlling the supplying and dispensing of hydrogen gas to and from the tanks; and
   (e) a ventilation assembly comprising
      (i) a ventilation air flow path extending from the external air inlet to the ventilation air outlet, the tanks, electrical components and process components being located within the ventilation air flow path; and
      (ii) a fan located in the air flow path near the external air inlet and upstream of the tanks, electrical components and process components, and operable to direct air through the air flow path at a rate that maintains the leaked hydrogen concentration in the air flow path below a selected threshold.

17. The fueling station of claim 1 further comprising a hydrogen dispenser system mounted to the enclosure and couplable to said tanks.

18. The fueling station of claim 16 further comprising an electrical component housing within the enclosure and housing the electrical components, the electrical component housing comprising a pressurization air inlet in air communication with the fan such that the air pressure inside the electrical component housing can be maintained at above-ambient pressure.

19. The fueling station of claim 16 further comprising a tank housing mounted within the enclosure and housing the tanks, the tank housing comprising a ventilation inlet and outlet in fluid communication with the ventilation air flow path.

20. The fueling station of claim 16 wherein the process components are located substantially beneath the tanks.

21. The fueling station of claim 16 wherein the process components include pneumatic valves in communication with the controller, coupled to the tanks and located in the ventilation air flow path, and a compressor pneumatically connected to the pneumatic valves.

22. The fueling station of claim 16 wherein the process components include an electrolyzer in electrical communication with the controller and having a hydrogen product outlet in hydrogen communication with the tanks, an oxygen product outlet, and a water supply inlet communicable with a water supply.

23. The fueling station of claim 22 wherein the oxygen product outlet is in air communication with the air flow path.

24. The fueling station of claim 16 wherein the process components include a charge port capable of coupling to a hydrogen supply source, and supply piping in hydrogen communication with the charge port and at least one tank.

25. The fueling station of claim 24 wherein the process components include a hydrogen charge compressor in electrical communication with the controller and in hydrogen communication with the supply piping upstream of the tank and downstream of the charge port.

26. The fueling station of claim 16 wherein the process components include a cascade compressor in electrical communication with the controller and cascade piping in hydrogen communication with the cascade compressor and the tanks.

27. The fueling station of claim 16 further comprising a process component housing located within the enclosure below the tanks, and housing the process components, the process component housing comprising a ventilation air inlet and outlet in fluid communication with the ventilation flow path.

28. The fueling station of claim 16 wherein the electrical component housing is located beneath the tanks and further comprises an air outlet and the ventilation assembly further comprises an exhaust duct extending from the electrical component housing air outlet to the enclosure ventilation air outlet.

29. The fueling station of claim 16 further comprising a hydrogen dispenser system mounted to the enclosure and couplable to said tanks.

30. The fuel station of claim 16 wherein the enclosure is substantially vertically elongate.

31. The fueling station of claim 30 wheein the external air inlet is near the base of the enclosure.

32. The fueling station of claim 30 wherein the ventilation air outlet is at the top of the enclosure.

33. The fueling station of claim 32 wherein the tanks are elongated and are positioned on end inside the enclosure.

* * * * *